(12) United States Patent
McQuillan

(10) Patent No.: US 10,768,240 B2
(45) Date of Patent: Sep. 8, 2020

(54) GENERATING ONE-LINE ELECTRICAL NETWORK DIAGRAMS

(71) Applicant: SCHNEIDER ELECTRIC USA, INC., Palatine, IL (US)

(72) Inventor: Jayme Lee McQuillan, Murfreesboro, TN (US)

(73) Assignee: SCHNEIDER ELECTRIC USA, INC., Palatine, IL (US)

(*) Notice: Subject to any disclaimer, the term of this patent is extended or adjusted under 35 U.S.C. 154(b) by 119 days.

(21) Appl. No.: 14/763,575

(22) PCT Filed: Feb. 6, 2013

(86) PCT No.: PCT/US2013/024980
§ 371 (c)(1),
(2) Date: Jul. 27, 2015

(87) PCT Pub. No.: WO2014/123526
PCT Pub. Date: Aug. 14, 2014

(65) Prior Publication Data
US 2016/0003920 A1    Jan. 7, 2016

(51) Int. Cl.
*G01R 31/40* (2020.01)
*G06F 30/367* (2020.01)
(Continued)

(52) U.S. Cl.
CPC .......... *G01R 31/40* (2013.01); *G06F 30/367* (2020.01); *G06T 11/001* (2013.01); *G06T 11/20* (2013.01);
(Continued)

(58) Field of Classification Search
None
See application file for complete search history.

(56) References Cited

U.S. PATENT DOCUMENTS

| | | | |
|---|---|---|---|
| 5,220,512 A | 6/1993 | Watkins et al. | |
| 5,517,663 A * | 5/1996 | Kahn | G06F 8/34 345/473 |

(Continued)

OTHER PUBLICATIONS

Extended European Search Report from corresponding European Application No. 13874719.1 dated Jul. 18, 2016.
(Continued)

*Primary Examiner* — Khaja Ahmad
(74) *Attorney, Agent, or Firm* — Lando & Anastasi, LLP

(57) ABSTRACT

A method for animating a one-line electrical network diagram includes receiving, on a computer via a graphical user interface, the one-line electrical network diagram comprising electrical component data representing a plurality of electrical components, analyzing, by the computer, the one-line electrical network diagram to recognize each of the plurality of electrical components, determining, for each of the plurality of electrical components, a functional type of the electrical component, determining, for each of the plurality of electrical components, one or more properties of the electrical component, and based on the functional types and properties of each of the electrical components, generating an animation algorithm of the one-line electrical network diagram, the animation algorithm controlling animation of the one-line electrical network diagram, the animation showing at least one flow of power through at least one of the plurality of electrical components.

20 Claims, 7 Drawing Sheets

(51) Int. Cl.
  *G06T 11/00* (2006.01)
  *G06T 11/20* (2006.01)
  *G06T 13/80* (2011.01)
  *H02J 3/06* (2006.01)
  *G06F 119/06* (2020.01)

(52) U.S. Cl.
  CPC .......... *G06T 13/80* (2013.01); *G06F 2119/06* (2020.01); *H02J 3/06* (2013.01); *H02J 2203/20* (2020.01); *Y02E 60/76* (2013.01); *Y04S 40/22* (2013.01)

(56) References Cited

U.S. PATENT DOCUMENTS

| | | | | |
|---|---|---|---|---|
| 5,742,795 | A * | 4/1998 | Kussel | G06F 17/509 703/2 |
| 6,313,752 | B1 * | 11/2001 | Corrigan | H02H 7/263 324/76.13 |
| 6,549,880 | B1 * | 4/2003 | Willoughby | H02J 3/00 700/22 |
| 2006/0238364 | A1 * | 10/2006 | Keefe | G05B 23/0267 340/646 |
| 2008/0234986 | A1 * | 9/2008 | Chen | G05B 19/41885 703/1 |
| 2009/0066528 | A1 * | 3/2009 | Bickel | G01D 4/004 340/657 |
| 2009/0099832 | A1 | 4/2009 | Nasle | |
| 2010/0110932 | A1 * | 5/2010 | Doran | H04L 41/12 370/254 |
| 2012/0022833 | A1 | 1/2012 | Sasaki | |
| 2013/0030586 | A1 | 1/2013 | Milosevic et al. | |
| 2013/0179140 | A1 * | 7/2013 | Sharma | G06F 17/509 703/13 |
| 2013/0249300 | A1 * | 9/2013 | Fishman | H01L 31/02016 307/82 |
| 2014/0062987 | A1 * | 3/2014 | Pietro | G09G 3/30 345/212 |

OTHER PUBLICATIONS

Notification of Transmittal of the International Search Report and the Wirtten Opinion of the International Searching Authority from corresponding PCT/US2013/024980 dated Apr. 15, 2013.

Overbye et al. A User-Friendly Simulation Program for Teaching Power System Operations. IEEE Transactions on Power Systems, vol. 10, No. 4. Nov. 1995. [Retrieved on Mar. 29, 2013]. Retrieved form the internet: <URL:http://energy.ece.illinois.edu/GROSS/files/User"/o20friendly%20simulation%2010-4-1995_1EEETPS.pdf> entire document.

Overbye et al. Visualizing Power System Operations in an Open Market. IEEE, Computer Applications in Power. Jan. 1997. [Retrieved on Mar. 29, 2013]. Retrieved form the internet: <URL:http://energy.ece.illinois .edu/GROSS/papers/1997%20Jan.pdf> entire document.

\* cited by examiner

GENERATING ONE-LINE ELECTRICAL NETWORK DIAGRAMS

RELATED APPLICATION

This application is a U.S. National Stage Application under 35 U.S.C. § 371 of International Application No. PCT/US2013/024980, filed Feb. 6, 2013, which is hereby incorporated herein by reference in its entirety.

BACKGROUND

Field of Invention

At least some embodiments disclosed herein relate to systems and methods for generating one-line diagrams.

Discussion of Related Art

One-line electrical network diagrams provide simplified representations of electrical networks. Electrical components, such as circuit breakers, transformers, capacitors, bus bars, and power sources are represented as symbols. Lines represent connections between the electrical components. The one-line diagrams can be used to perform power flow analysis on the electrical networks. The power flow analysis can evaluate the electrical network and determine if the network meets designed criteria. The power flow analysis may further allow the user to see the real and reactive power losses and perform component testing to ensure the assets and their loads are performing within their ratings, both at steady state and in emergency conditions.

SUMMARY

At least one aspect disclosed herein is directed to a one-line diagram generating system. A method for animating a one-line electrical network diagram includes receiving, on a computer via a graphical user interface, the one-line electrical network diagram comprising electrical component data representing a plurality of electrical components, analyzing, by the computer, the one-line electrical network diagram to recognize each of the plurality of electrical components, determining, for each of the plurality of electrical components, a functional type of the electrical component, determining, for each of the plurality of electrical components, one or more properties of the electrical component, and based on the functional types and properties of each of the electrical components, generating an animation algorithm of the one-line electrical network diagram, the animation algorithm controlling animation of the one-line electrical network diagram, the animation showing at least one flow of power through at least one of the plurality of electrical components.

In some embodiments, determining one or more properties of the electrical component includes determining one or more other electrical components to which the electrical component is connected.

In some embodiments, generating an animation algorithm of the one-line diagram includes determining, for each electrical component, an algorithm specifying operational configurations in which the electrical component is powered.

In some embodiments, generating an animation algorithm of the one-line diagram further includes determining, for each electrical component, an algorithm specifying a power source for the electrical component.

In some embodiments, determining one or more properties of the electrical component includes determining a subset of required properties of the electrical component.

In some embodiments, the method further includes validating the required properties of the electrical components. In some embodiments, validating the required properties of the electrical components includes determining at least one power source and at least one destination bus connected to the at least one power source.

In some embodiments, generating the animation algorithm includes displaying a plurality of power flows from a plurality of power sources, each of the power flows represented by a color based on the power source.

In some embodiments, the method further includes detecting possible errors in the one-line electrical network diagram.

Aspects also include a system for animating a one-line electrical network diagram. The system includes a processor configured to receive, via a graphical user interface, the one-line electrical network diagram comprising electrical component data representing a plurality of electrical components, analyze the one-line electrical network diagram to recognize each of the plurality of electrical components, determine, for each of the plurality of electrical components, a functional type of the electrical component, determine, for each of the plurality of electrical components, one or more properties of the electrical component, and based on the functional types and properties of each of the electrical components, generate an animation algorithm of the one-line electrical network diagram, the animation algorithm controlling animation of the one-line electrical network diagram, the animation showing at least one flow of power through at least one of the plurality of electrical components.

Aspects also include a non-transitory computer readable medium having stored thereon sequences of instruction for animating a one-line electrical network diagram including instructions that will cause at least one processor to receive, via a graphical user interface, the one-line electrical network diagram comprising electrical component data representing a plurality of electrical components, analyze the one-line electrical network diagram to recognize each of the plurality of electrical components, determine, for each of the plurality of electrical components, a functional type of the electrical component, determine, for each of the plurality of electrical components, one or more properties of the electrical component, and based on the functional types and properties of each of the electrical components, generate an animation algorithm of the one-line electrical network diagram, the animation algorithm controlling animation of the one-line electrical network diagram, the animation showing at least one flow of power through at least one of the plurality of electrical components.

Still other aspects, examples, and advantages of these exemplary aspects and examples are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example. References to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of any particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

DETAILED DESCRIPTION

In at least some aspects and embodiments disclosed herein, the system can allow a user to generate a one-line electrical network diagram of a power system. The one-line diagram can include symbols representing electrical components and connections between the electrical components. The user can create the one-line electrical network diagram on a computer using a graphical user interface (GUI). For example, the GUI can provide icons representing the symbols for the one-line diagram. The GUI can also provide an interface for interaction to the user with the icons to generate the one-line diagram. For example, the user can click on and drag icons into place on the GUI to represent the one-line diagram. The system can process the one-line diagram to animate the one-line diagram. For example, the system can analyze the one-line diagram to determine each of the components in the one-line diagram. The system can determine properties related to each of the components. The system can present to the user an animation of the one-line diagram, showing one or more power flows through the power system represented by the one-line diagram.

Examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular may also embrace examples including a plurality, and any references in plural to any example, component, element or act herein may also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
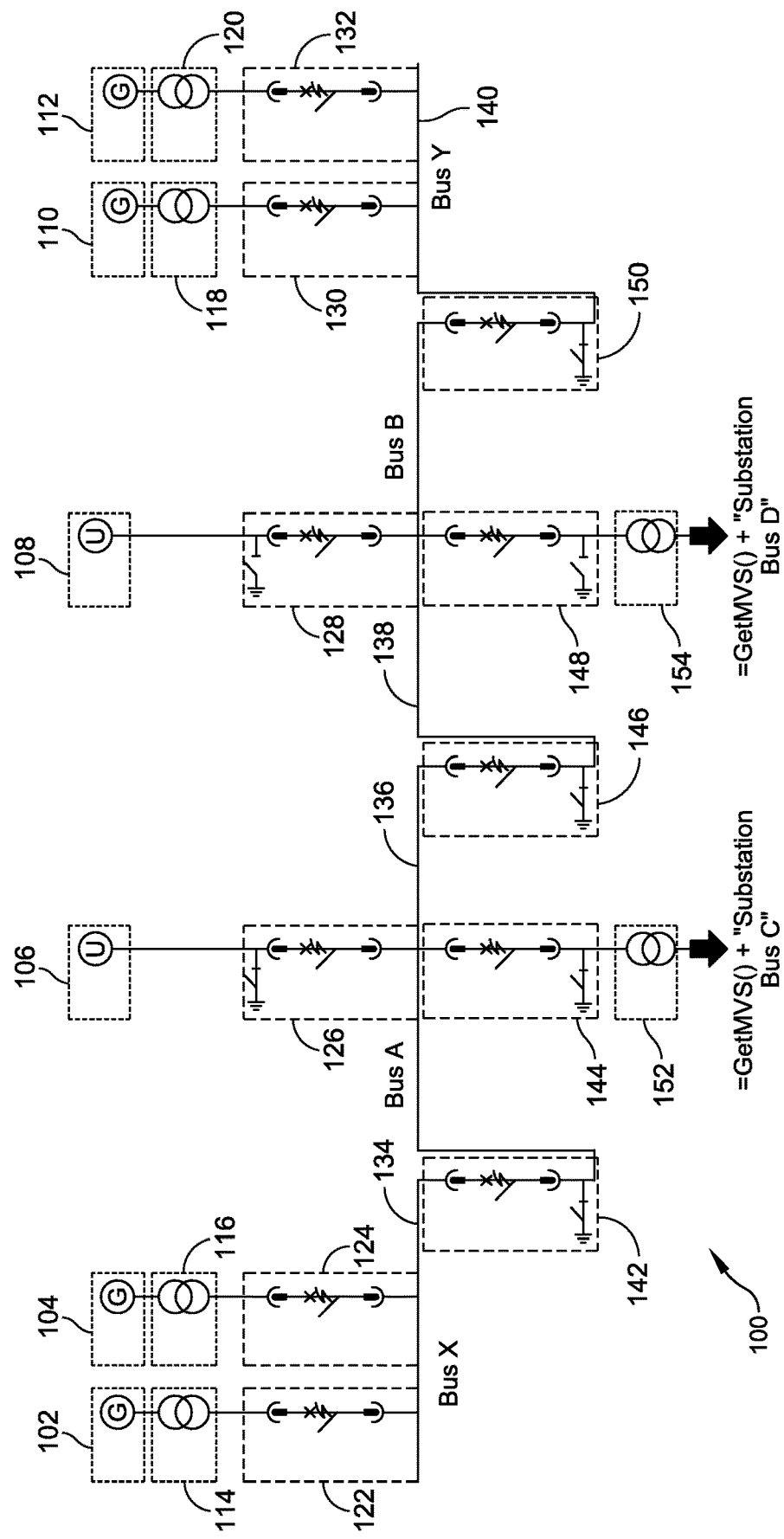
FIG. 1 is an example one-line diagram.

FIG. 1 shows an example one-line electrical network diagram depicting an example power system 100. Power systems include electrical components, including power sources, power carriers, power validators, power transferors, and other power objects. Power sources can include components such as generators, electric utilities, uninterruptible power supplies (UPSs), and other power supplies. Power carriers can include components such bus bars, capacitors, inductors, and other such components. Power validators can include components such as power meters, current transformers, and other components used to validate power flow. Power transferors can include components such as breakers, transfer switches, transformers, and other such components.

For example, the power system 100 includes four generators 102, 104, 110, 112. A first generator 102 is connected to a transformer 114, which is connected to a breaker 122. A second generator 104 is connected to another transformer 116, which is connected to another breaker 124. The breakers 122, 124 are connected to a first bus 134. The breaker 122 controls power flow from the first generator 102. For example, when the breaker 122 is closed, power can flow from the first generator 102, through the transformer 114 and to the first bus 134. Electrical components that are connected to the first bus 134 can then be powered by the first generator 102. Conversely, when the breaker 122 is open, power flow is interrupted from the first generator 102 to the first bus 134, and the first bus 134 and electrical components connected to the first bus 134 do not receive power from the first generator 102.

Similarly, the breaker 124 controls power flow from the second generator 104. The first bus 134 can receive power from the second generator 104 when the breaker 124 is closed. When the breaker 124 is open, power is not received at the first bus 134 from the second generator 104.

Another transformer 118 and breaker 130 are connected to the third generator 110. Yet another transformer 120 and breaker 132 are connected to the fourth generator 112. The transformers 118, 120 are connected to a second bus 140. The second bus 140 can receive power from the third and fourth generators 110, 112, controlled by the breakers 130, 132, respectively, in a manner similar to the first bus 134 and the first and second generators 102, 104.

The one-line diagram also includes two utility sources 106, 108. The two utility sources 106, 108 can be different connections to a same electric utility. Alternatively, the two utility sources 106, 108 can be connections to two separate electric utilities. A first utility source 106 is connected to another breaker 126, which is connected to a third bus 136. A second utility source 108 is connected to a breaker 128, which is connected to a fourth bus 138. The third bus 136 is connected to a breaker 144, which is connected to a transformer 152. The transformer 152 can output power to a subsystem connected to the transformer 152. The transformer 152 can also be connected to more elements, which can be presented on a second screen of the GUI, indicated by the arrow. The third bus 136 can be powered by the first utility source 106 when the breaker 126 is closed. The third bus 136 is also connected to the first bus 134 via a breaker 142. Thus the third bus 136 can also be powered by the first and/or second generator 102, 104, via the first bus 134 when the breaker 142 is closed.

The fourth bus 138 is also connected to a breaker 148, which is connected to a transformer 154 outputting power to connected subsystems. The fourth bus 138 can be powered by the second utility source 108 via the breaker 128. The fourth bus 138 is also connected to the third bus 136 and the second bus 140 via breakers 146, 150, respectively. Thus, each of the buses 134, 136, 138, 140 and components connected to the buses 134, 136, 138, 140 can be powered by a plurality of power sources, depending on the status of the breakers. The one-line diagram can be animated to illustrate the power flow in the power system 100.

Figure 2A:
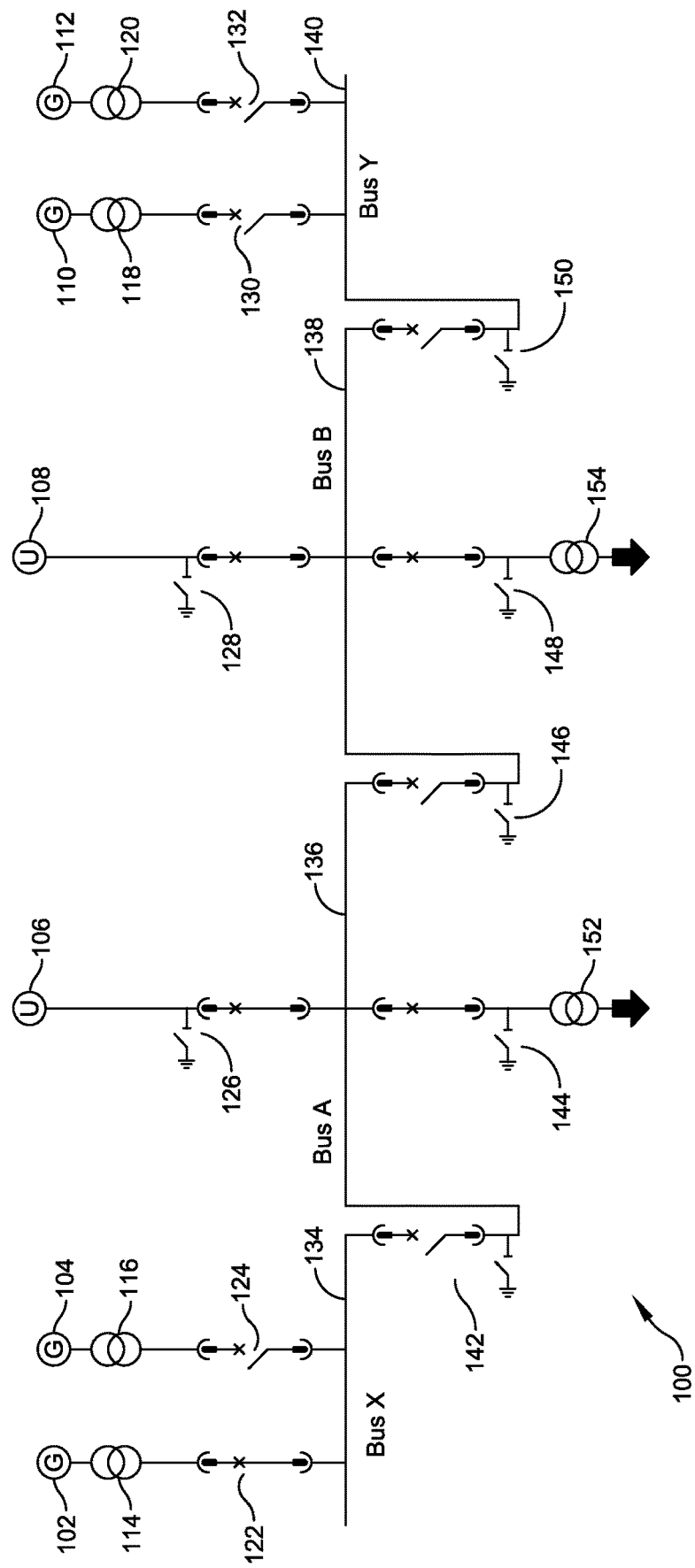
FIG. 2A is an example animation of the one-line diagram.
Figure 2B:
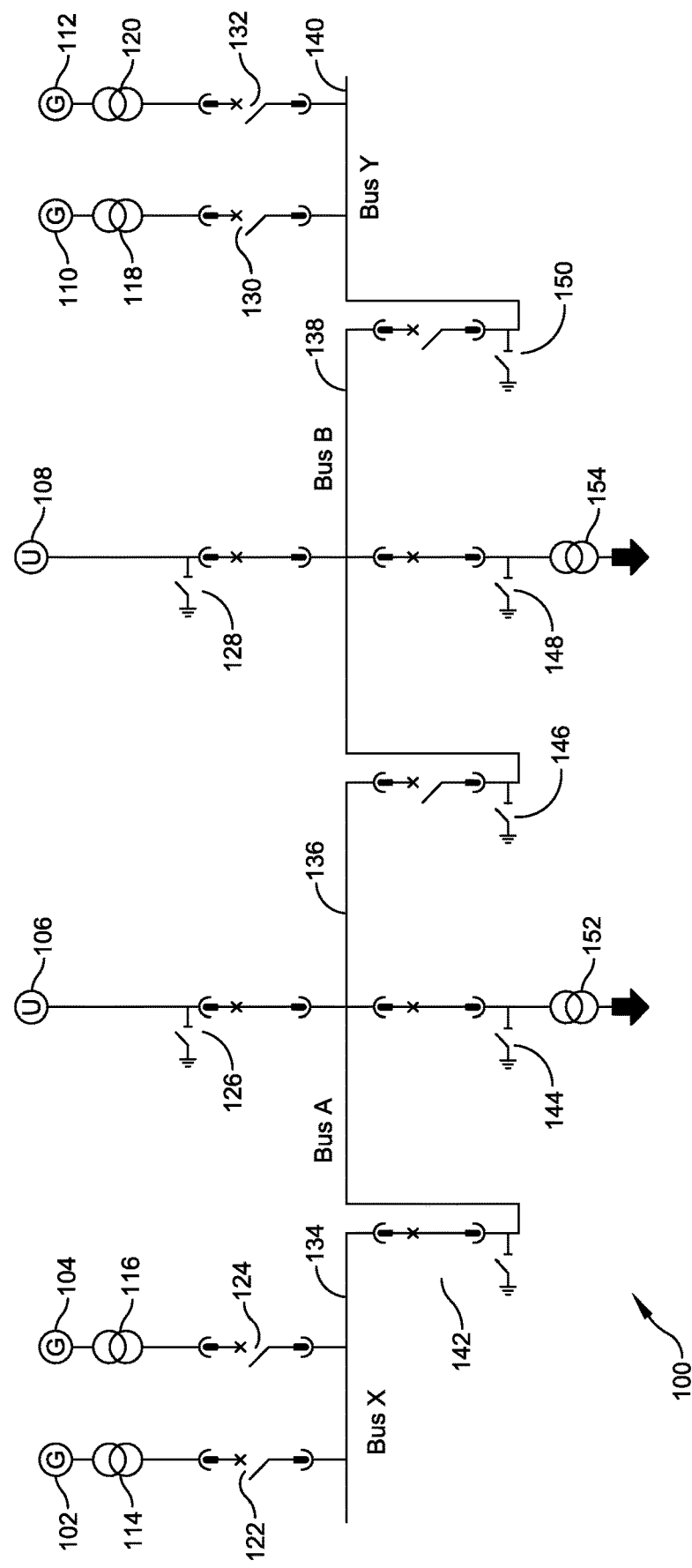
FIG. 2B is an example animation of the one-line diagram.

For example, referring to FIGS. 2A and 2B, the power flow in the power system 100 can be represented by different colors. Each of the power sources 102, 104, 106, 108, 110, 112 can be represented by a different color. The diagram can allow a user to interact with the diagram, to open and close breakers and see the effect on the power flow of the system 100. For example, in FIG. 2A, breakers 122, 126, and 128 are closed. Breaker 122 allows power to flow from the first generator 102 to the first bus 134. The first generator 102 can be represented by a color, such as blue. As the first bus 134 is receiving power from the first generator 102, the first bus 134 can also be colored blue. The second generator 104 can be represented by a second color, such as light blue. Transformer 116, connected to the second generator 104, can be colored light blue as well. However, as breaker 124 is open, the first bus 134 is not affected by the second generator 104.

Breaker 126 is also closed in FIG. 2A. As a result, the third bus 136 is powered by the first utility source 106. The first utility source 106 can be represented by the color green. Thus, the third bus 136 is also colored green. Breaker 144 is also closed, allowing power to flow through the third bus 136 and to transformer 152. Thus, the first utility source 106, breakers 126, 144, the third bus 136, and transformer 152 would be colored green to show the power flow from the first utility source 106.

Similarly, breakers 128 and 148 are closed, connecting the second utility source 108 to the fourth bus 138 and the elements connected to the fourth bus 138. The second utility source 108 can be represented by a different color, such as light green. The second utility source 108, breakers 128, 148, the fourth bus 138, and transformer 154 would then be colored light green to show the elements that are powered by the second utility source 108.

In contrast, the breakers 130, 132 connected to the second bus 140 are both open, preventing power from the third and fourth generators 110, 112 from flowing to the second bus 140. As breaker 150 is also open, the second bus 140 remains unpowered in FIG. 2A.

FIG. 2B shows the same power system 100 configured to provide a different power flow from that of FIG. 2A. Breaker 122 is open, interrupting the flow of power from the first generator 102 to the first bus 134. Instead, breaker 142 is closed, allowing power to flow from the first utility 106 to the first bus 134 via the third bus 136. Thus, the first bus 134 would be colored green to show the power flow from the first utility 106, through breaker 126, the third bus 136, and breaker 142 to the first bus 134.

The system provides the user with the ability to interact with the one-line diagram, such as clicking on a breaker to open or close the breaker. As the user interacts with the one-line diagram, the power flow in the power system can change. The animation of the one-line diagram illustrates the changes in the power flow as properties and/or statuses of components in the one-line diagram are changed by the user or by a control logic, which can correspond to changes in the power system.

Figure 3:
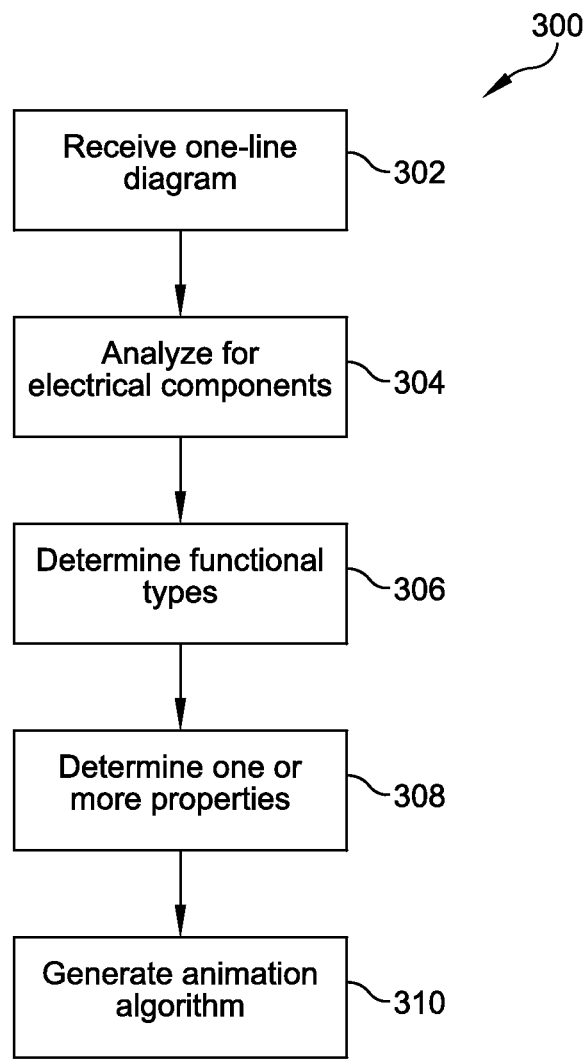
FIG. 3 is a flow chart of an example process.

FIG. 3 is a flow chart of an example process 300 for animating a one-line diagram using a computer system. In the example, the system receives a one-line diagram at act 302. Receiving a one-line diagram includes a user generating a one-line diagram using a GUI, as described above. Additionally or alternatively, a user can import existing one-line diagrams stored locally on the system or stored remotely.

In some embodiments, the system analyzes the one-line diagram to recognize electrical components at act 304. For example, the system can graphically process the one-line diagram to determine each of the electrical components of the one-line diagram. For each of the electrical components, the system determines a functional type of the electrical component at act 306. For example, the system can determine a functional category of the electrical component, such as a power source or power carrier. Additionally or alternatively, the system can determine the functional type more specifically based on each electrical component, such as a breaker or a generator. The system can determine the functional types based on a graphical analysis of each symbol on the one-line diagram. For example, the system can use image processing techniques to recognize a symbol for a generator. The symbols can be in accordance with one-line diagram conventions and/or include user-defined symbols. Additionally or alternatively, the system can receive data from the GUI that can be used to determine the symbols that have been placed in the one-line diagram. In this way, the functional types of each of the electrical components can be determined.

In some embodiments, the system determines one or more properties of each of the electrical components recognized in the one-line diagram at act 308. Properties of an electrical component are characteristics that affect the operation of the electrical component or provide information about the electrical component. Properties can vary depending on the functional type of the electrical component. For example, properties of a power source can include a destination bus bar and information indicating when the source is energized (e.g., from a metering point of an external meter or programmable logic controller (PLC)). Properties of a transfer switch can include a first and a second source bus bar and a destination bus bar. Properties of a breaker can include a source bus bar, a destination bus bar, and equipment monitoring the breaker. Properties of a meter can include a source bus bar and information indicating when the meter is active. Properties of a transformer can include a source bus bar, a destination bus bar, and simulated source. The simulated source allows the transformer to emulate a voltage source, as in some embodiments, different voltages are represented by different colors. Thus, each side of the transformer can be represented in a different color to indicate the change in voltage. Properties of electrical components can also include identifying information, such as functional type and identification numbers.

Properties can be determined based on the one-line diagram through the GUI. For example, the positions of electrical components can provide information relating to the properties. For example, if a generator is placed in contact with a bus bar, the system can determine that the bus bar is the destination bus bar of the generator. Additionally or alternatively, properties can be input and/or modified by the user.

In some embodiments, the system generates an animation algorithm based on the functional types and properties of the electrical components at act 310. The system determines possible power flows from power sources through power carriers to electrical components in the one-line diagram based on the determined properties and functional types. For example, by determining when each power source is energized and the electrical components that are connected to each power source, the system can illustrate power flows from each of the power sources. The animation algorithm can be automatically generated by the system, instead of having a user manually input the logic for each of the electrical components and when each is energized by which power source.

The animation algorithm can include an algorithm for each electrical component specifying when the electrical component is powered and by what source. For example, referring back to FIG. 2A, an example algorithm for the first bus 134 can include specifying that the first bus 134 is powered when breaker 122 is closed. When breaker 122 is closed, the power source for the first bus 134 is the first generator 102. The algorithm can further include specifying that the first bus 134 is powered when breaker 124 is closed. When breaker 124 is closed, the power source for the first bus 134 is the second generator 104. The algorithm can further include specifying that the first bus 134 is powered when the third bus 136 is powered and breaker 142 is closed. When the third bus 136 is powered and breaker 142 is closed, the power source for the first bus 134 is the same as the power source for the third bus 136. Whether the third bus 136 is powered can be determined by a separate algorithm for the third bus 136. Thus, the animation algorithm can include algorithms for each of the electrical components.

The algorithms for each of the electrical components can be based, at least in part, on the properties of the electrical component. The properties and the information provided by the properties can be used to determine states of the electrical component. For example, a breaker can have properties for power values and for statuses including open, closed, and tripped. The property values can be mapped to information received from a PLC, an external device, and/or calculations done by the system. This information can be used to determine the algorithm for the electrical component.

Figure 4:
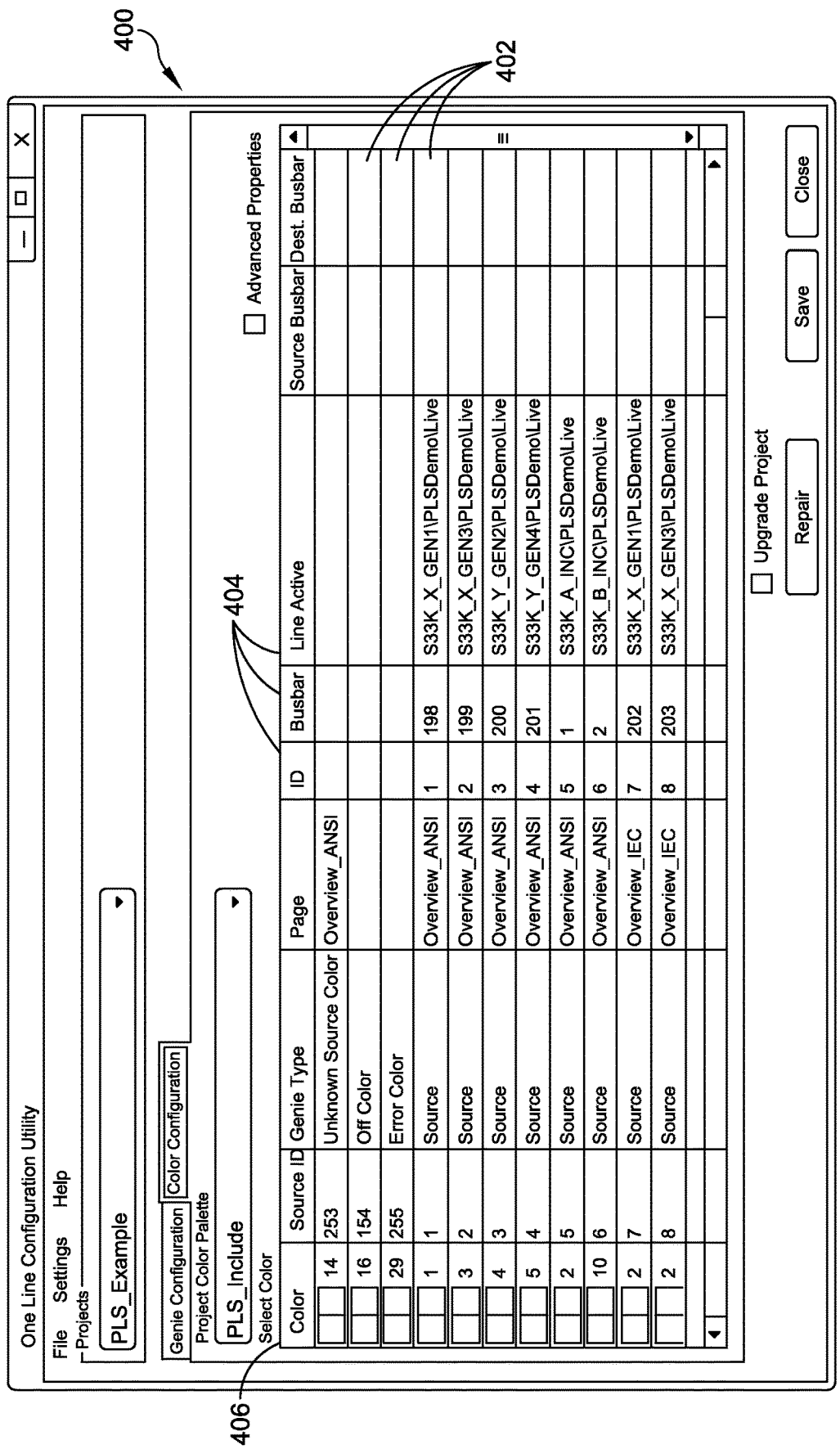
FIG. 4 is a screenshot of an example user interface.

FIG. 4 is a screenshot of an example user interface 400. In some embodiments, the user interface 400 shows a row 402 for each of the electrical components in the one-line diagram. Properties of the electrical components are shown in columns 404, such as functional type, identification number, and other properties. Each of the power sources can be assigned a color 406 to animate the power flow in the one-line diagram. Additionally or alternatively, colors 406 can be determined by voltage levels of the power sources.

The system can also perform validation on the one-line diagram to detect possible errors and problems in the power system or the one-line diagram. For example, the system can verify that at least one power source exists and that power sources are connected to a bus bar. A subset of the properties of the electrical components can be designated as required properties. The system can verify during validation that each of the electrical components have valid values for the required properties. Valid values can include requiring unique values across the system. Valid values can also include requiring unique values for the electrical component, such as a destination bus bar being unique from a source bus bar for the electrical component.

Figure 5:
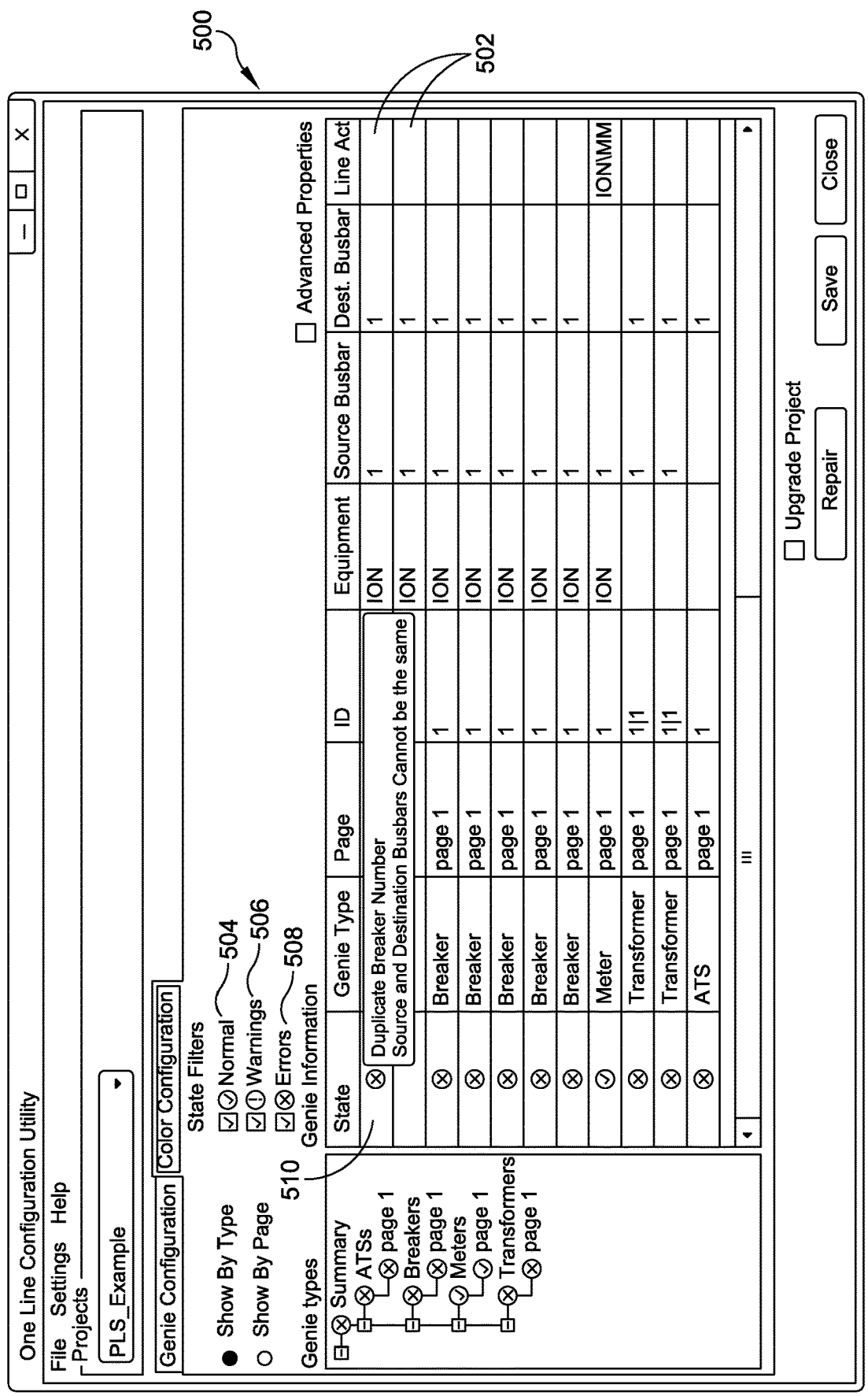
FIG. 5 is a screenshot of an example user interface.

FIG. 5 is a screenshot of an example user interface 500 for performing validation. The system can detect potential problems and provide errors and warnings to the user. In some embodiments, errors can be provided for problems in the one-line diagram that may damage the power system or are not possible to configure in the power system, such as missing or invalid values for required properties. Warnings can be provided for less harmful errors, such as an electrical component that is not connected to a potential power source. The user interface 500 can present the errors and warnings to the user for each of the electrical components. The user interface 500 can also present a validated status for electrical components for which no warnings or errors have been detected. For example, each row 502 can show an electrical component of the one-line diagram. Normal status 504 can be represented by a check mark. Warnings 506 can be represented by an exclamation point. Errors 508 can be represented by an "X." A state column 510 can display one or more of these symbols depending on the status of each of the electrical components.

In some embodiments, the system can repair errors and warnings in the one-line diagram. For example, electrical components without an appropriate bus bar value can be assigned a bus bar value of the bus bar closest to the electrical component. The system can provide suggestions to the user for the user to adopt or discard.

While the examples above have been described with respect to a one-line diagram for a power system, the one-line diagram can represent a supervisory control and data acquisition (SCADA) system or any other system including power flow analyses.

Various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 6:
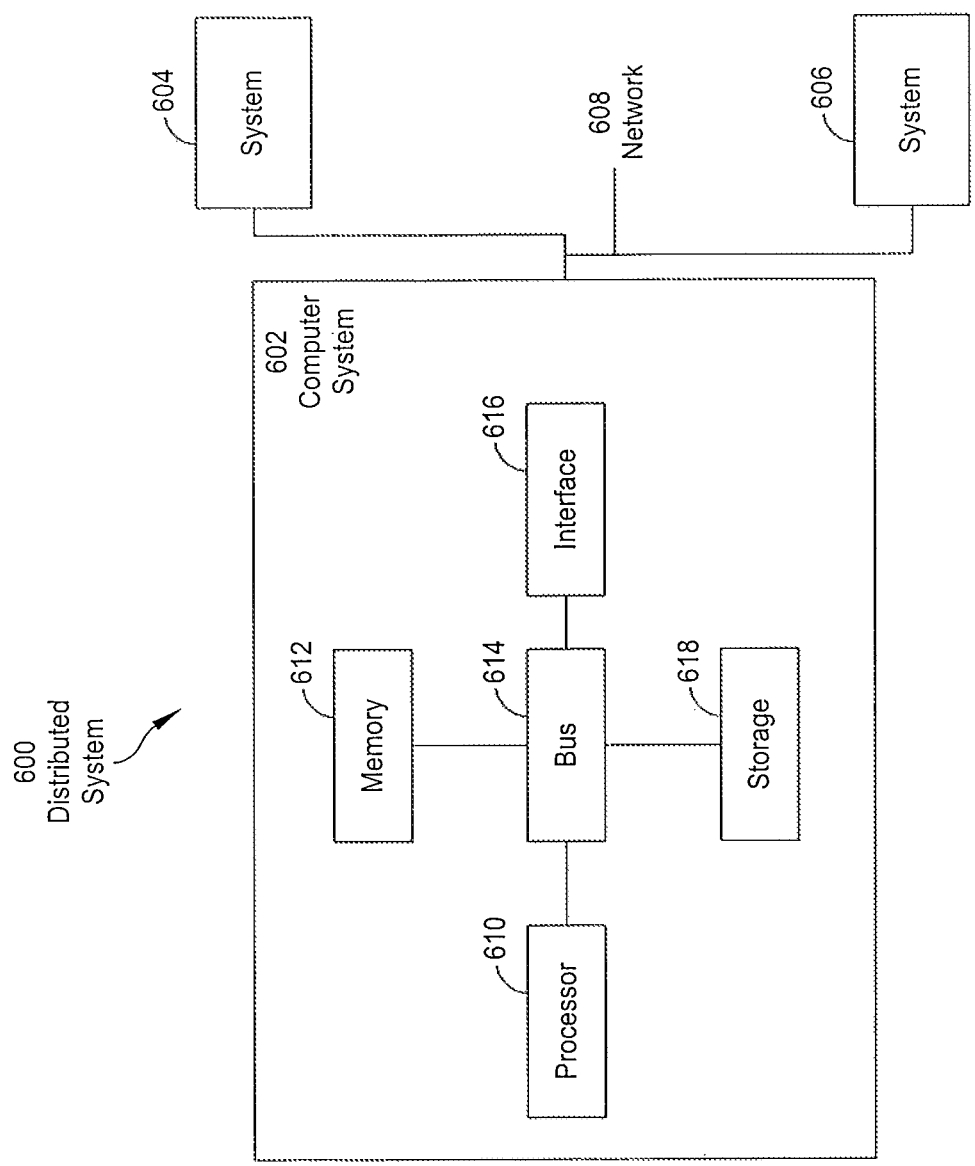
FIG. 6 is a schematic diagram of an example of a computer system that may perform processes and functions disclosed herein.

Referring to FIG. 6, there is illustrated a block diagram of a distributed computer system 600, in which various aspects and functions are practiced. As shown, the distributed computer system 600 includes one more computer systems that exchange information. More specifically, the distributed computer system 600 includes computer systems 602, 604 and 606. As shown, the computer systems 602, 604 and 606 are interconnected by, and may exchange data through, a communication network 608. The network 608 may include any communication network through which computer systems may exchange data. To exchange data using the network 608, the computer systems 602, 604 and 606 and the network 608 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 602, 604 and 606 may transmit data via the network 608 using a variety of security measures including, for example, TLS, SSL or VPN. While the distributed computer system 600 illustrates three networked computer systems, the distributed computer system 600 is not so limited and may include any number of computer systems and computing devices, networked using any medium and communication protocol.

As illustrated in FIG. 6, the computer system 602 includes a processor 610, a memory 612, an interconnection element 614, an interface 616 and data storage 618. To implement at least some of the aspects, functions and processes disclosed herein, the processor 610 performs a series of instructions that result in manipulated data. The processor 610 may be any type of processor, multiprocessor or controller. Some exemplary processors include commercially available processors such as an Intel Xeon, Itanium, Core, Celeron, or Pentium processor, an AMD Opteron processor, a Sun UltraSPARC or IBM Power5+ processor and an IBM mainframe chip. The processor 610 is connected to other system components, including one or more memory devices 612, by the interconnection element 614.

The memory 612 stores programs and data during operation of the computer system 602. Thus, the memory 612 may be a relatively high performance, volatile, random access memory such as a dynamic random access memory (DRAM) or static memory (SRAM). However, the memory 612 may include any device for storing data, such as a disk drive or other non-volatile storage device. Various examples may organize the memory 612 into particularized and, in some cases, unique structures to perform the functions disclosed herein. These data structures may be sized and organized to store values for particular data and types of data.

Components of the computer system 602 are coupled by an interconnection element such as the interconnection element 614. The interconnection element 614 may include one or more physical interconnection elements, for example, interconnection elements between components that are integrated within a same machine, but may include any communication coupling between system elements including specialized or standard computing interconnection element technologies such as IDE, SCSI, PCI and InfiniBand. The interconnection element 614 enables communications, such as data and instructions, to be exchanged between system components of the computer system 602.

The computer system 602 also includes one or more interface devices 616 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 602 to exchange information and to communicate with external entities, such as users and other systems.

The data storage 618 includes a computer readable and writeable nonvolatile, or non-transitory, data storage medium in which instructions are stored that define a program or other object that is executed by the processor 610. The data storage 618 also may include information that is recorded, on or in, the medium, and that is processed by the processor 610 during execution of the program. More specifically, the information may be stored in one or more data structures specifically configured to conserve storage space or increase data exchange performance. The instructions may be persistently stored as encoded signals, and the instructions may cause the processor 610 to perform any of the functions described herein. The medium may, for example, be optical disk, magnetic disk or flash memory, among others. In operation, the processor 610 or some other controller causes data to be read from the nonvolatile recording medium into another memory, such as the memory 612, that allows for faster access to the information by the processor 610 than does the storage medium included in the data storage 618. The memory may be located in the data storage 618 or in the memory 612, however, the processor 610 manipulates the data within the memory, and then copies the data to the storage medium associated with the data storage 618 after processing is completed. The processor 610 can also manipulate the data and provide manipulated data to a user on a display and/or a communication interface. A variety of components may manage data movement between the storage medium and other memory elements and examples are not limited to particular data management components. Further, examples are not limited to a particular memory system or data storage system.

Although the computer system 602 is shown by way of example as one type of computer system upon which various aspects and functions may be practiced, aspects and functions are not limited to being implemented on the computer system 602 as shown in FIG. 6. Various aspects and functions may be practiced on one or more computers having a different architectures or components than that shown in FIG. 6. For instance, the computer system 602 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 602 may be a computer system including an operating system that manages at least a portion of the hardware elements included in the computer system 602. In some examples, a processor or controller, such as the processor 610, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 610 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g. specialized hardware, executable code, data structures or objects, that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters, such as sponsor types and sectors, and thereby configure the behavior of the components.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for analyzing power flow in a power system comprising:
generating, on a computer system, a one-line electrical network diagram indicative of the power system, the one-line electrical network diagram including representations of electrical components in the power system and connections between the electrical components in the power system;
analyzing, by the computer system, the one-line electrical network diagram to recognize each of the electrical components, the electrical components including at least one power source, at least one power transferor, at least one power carrier and at least one power validator, wherein the at least one power transferor is configured to transfer power received from the at least one power source to the at least one power carrier, and the at least one power validator is configured to validate a flow of power between the at least one power source, the at least one power transferor and the at least one power carrier;
determining, for each of the electrical components, a functional type of the electrical component based on a graphical analysis of the electrical component, the functional type of the electrical component indicating a specific type of the at least one power source, the at least one power transferor, the at least one power carrier, or the at least one power validator corresponding to the electrical component;
determining, for each of the electrical components, one or more properties of the electrical component, the properties corresponding to characteristics that affect the operation of the electrical component or provide information about the electrical component; based on the functional types and properties of each of the electrical components, determining current states of each of the electrical components, and generating animation algorithms for each of the electrical components, the animation algorithms controlling animation of the one-line electrical network diagram, the animation showing at least flow of power in the power system based on the current states of each of the electrical components; and
evaluating the flow of power depicted by the animation to detect and repair potential problems associated with the power system,
wherein the animation algorithms include an algorithm for identifying, for each one of the electrical components, which power source of the at least one power source is used to power the one of the electrical components.

2. The method of claim 1, wherein determining one or more properties of the electrical component comprises determining one or more other electrical components to which the electrical component is connected.

3. The method of claim 1, wherein generating animation algorithms for each of the components comprises determining, for each electrical component, an algorithm specifying operational configurations in which the electrical component is powered.

4. The method of claim 3, wherein generating animation algorithms for each of the electrical components further comprises determining, for each electrical component, an algorithm specifying a power source for the electrical component.

5. The method of claim 1, further comprising determining required properties of the electrical component and validating the required properties, wherein validating the required properties of the electrical component comprises determining at least one destination bus connected to the at least one power source.

6. The method of claim 1, wherein generating the animation algorithms comprises displaying a plurality of power flows from a plurality of power sources, each of the power flows represented by a color based on the at least one power source.

7. A system for analyzing power flow in a power system, the system comprising a processor configured to:
generate, on the system, a one-line electrical network diagram indicative of the power system, the one-line electrical network diagram including representations of electrical components in the power system and connections between the electrical components in the power system;

analyze, by the system, the one-line electrical network diagram to recognize each of the electrical components, the electrical components including at least one power source, at least one power transferor, at least one power carrier and at least one power validator, wherein the at least one power transferor is configured to transfer power received from the at least one power source to the at least one power carrier, and the at least one power validator is configured to validate a flow of power between the at least one power source, the at least one power transferor and the at least one power carrier;

determine, for each of the electrical components, a functional type of the electrical component based on a graphical analysis of the electrical component, the functional type of the electrical component indicating a specific type of the at least one power source, the at least one power transferor, the at least one power carrier, or the at least one power validator corresponding to the electrical component;

determine, for each of the electrical components, one or more properties of the electrical component, the properties corresponding to characteristics that affect the operation of the electrical component or provide information about the electrical component; based on the functional types and properties of each of the electrical components, determine current states of each of the electrical components, and generate animation algorithms for each of the electrical components, the animation algorithms controlling animation of the one-line electrical network diagram, the animation showing at least flow of power in the power system based on the current states of each of the electrical components; and evaluate the flow of power depicted by the animation to detect and repair potential problems associated with the power system, wherein the animation algorithms include an algorithm for identifying, for each one of the electrical components, which power source of the at least one power source is used to power the one of the electrical components.

8. The method of claim 1, wherein evaluating the flow of power includes:

adjusting the current state of at least one of the electrical components to a new state to see the effect on the power flow of the power system.

9. The method of claim 8, wherein the at least one of the electrical components includes a breaker, and the current state of the breaker is open and the new state of the breaker is closed.

10. The method of claim 1, wherein determining a functional type of the electrical component based on a graphical analysis of the electrical component includes using image processing techniques to determine the functional type of the electrical component, the image processing techniques including recognizing a symbol for the functional type of the electrical component in the one-line electrical network diagram.

11. The method of claim 1, wherein the representations of the electrical components in the power system and the connections between the electrical components are symbols in the one-line electrical network diagram.

12. The method of claim 11, wherein the symbols include user-defined symbols, and the properties of the electric components associated with the user-defined symbols are input and/or modified by the user.

13. The method of claim 1, wherein the specific type of the at least one power source includes at least one of a generator, an electric utility and an uninterruptable power supply (UPS).

14. The method of claim 1, wherein the specific type of the at least one power carrier includes at least one of a bus bar, a capacitor and an inductor.

15. The method of claim 1, wherein the specific type of the at least one power validator includes at least one of a power meter, a current transformer and other components to validate power flow.

16. The method of claim 1, wherein the specific type of the at least one power transferor includes at least one of a breaker, a transfer switch and a transformer.

17. The method of claim 1, wherein detecting and repairing potential problems with the power system includes providing errors for problems that may damage the power system.

18. The method of claim 1, wherein detecting and repairing potential problems with the power system includes providing suggestions to a system user for the user to adopt or discard.

19. The method of claim 1, wherein the algorithm for identifying is configured to detect disconnection of the one of the electrical components from the at least one power source and connection of the one of the electrical components to a different power source, and is configured to change a displayed color of the one of the electrical components corresponding to the at least one power source to a different displayed color corresponding to the different power source.

20. The system of claim 7, wherein the algorithm for identifying is configured to detect disconnection of the one of the electrical components from the at least one power source and connection of the one of the electrical components to a different power source, and is configured to change a displayed color of the one of the electrical components corresponding to the at least one power source to a different displayed color corresponding to the different power source.

* * * * *